United States Patent [19]

Turricchia

[11] Patent Number: 5,315,625
[45] Date of Patent: May 24, 1994

[54] METHOD FOR PROTECTING THE BASE OF THE REACTOR CONTAINER IN NUCLEAR POWER PLANTS, AND A DEVICE FOR IMPLEMENTING THE METHOD

[75] Inventor: Arnaldo Turricchia, Rome, Italy
[73] Assignee: Enel S.p.A., Rome, Italy
[21] Appl. No.: 969,986
[22] Filed: Nov. 2, 1992
[30] Foreign Application Priority Data
  Nov. 5, 1991 [IT] Italy ............ MI.91-A/002930
[51] Int. Cl.$^5$ ................................. G21C 9/00
[52] U.S. Cl. ........................... 376/280; 376/287; 376/288
[58] Field of Search ........... 376/280, 279, 287, 288; 976/DIG. 139, DIG. 143, DIG. 146

[56] References Cited

U.S. PATENT DOCUMENTS 4,113,560  9/1978  Driscoll et al. ............... 376/280
5,057,271 10/1991  Turricchia .................... 376/280

FOREIGN PATENT DOCUMENTS 0392604 10/1990 European Pat. Off. .
0419159  3/1991 European Pat. Off. .
4032736  4/1992 Fed. Rep. of Germany .

OTHER PUBLICATIONS

European Search Report; The Hague; Jan. 18, 1993, Examiner: Jandl.

Primary Examiner—Donald P. Walsh
Assistant Examiner—Frederick H. Voss
Attorney, Agent, or Firm—Hedman, Gibson & Costigan

[57] ABSTRACT

This invention relates to a method for protecting the integrity of the reactor container base in nuclear power plants, and a device for implementing the method.

The proposed method and device are applicable to all reactor types (PWR or pressurized water reactor, BWR or boiling water reactor, HWR or heavy water reactor, etc.) and to all types of containing system (large dry type, steam suppression type, condensation on ice type, subatmospheric type etc.), although for simplicity the present text will describe only their application to a PWR with a steam suppression and large dry containing system.

13 Claims, 7 Drawing Sheets

METHOD FOR PROTECTING THE BASE OF THE REACTOR CONTAINER IN NUCLEAR POWER PLANTS, AND A DEVICE FOR IMPLEMENTING THE METHOD

BACKGROUND OF THE INVENTION

This invention relates to a method for protecting the integrity of the reactor container base in nuclear power plants, and a device for implementing the method.

The proposed method and device are applicable to all reactor types (PWR or pressurized water reactor, BWR or boiling water reactor, HWR or heavy water reactor, etc.) and to all types of containing system (large dry type, steam suppression type, condensation on ice type, subatmospheric type etc.), although for simplicity in the present text will describe only their application to a PWR with a steam suppression and large dry containing system.

U.S. Pat. No. 5,057,271 of the present applicant describes a system for protecting the base or foundation slab of the reactor containing building in nuclear power plants against erosion and degradation by molten material escaping from the reactor pressure vessel as as result of serious accident, the system comprising a chamber holding at least part of said pressure vessel and comprising below the vessel a cavity containing a structure immersed in a cooling fluid and composed of a plurality of superposed beams arranged suitably offset in layers, to intercept the molten material escaping from the reactor pressure vessel in the case of melt-down of its core, and to uniformly and three-dimensionally distribute the molten material over a large heat transfer surface, hence preventing its direct contact with the base of the cavity. According to the aforesaid patent each of said beams forming the structure or pile immersed in the cooling fluid can be of double T cross-section with a U-shaped upper flange and can be constructed for example of stainless steel. In this manner the molten material can be redistributed into a plurality of layers of small thickness to rapidly cool and resolidify, aided in this by the cooling fluid in which the pile of beams is immersed.

This very rapid contact between the molten material and the cooling fluid which floods the cavity below the reactor pressure vessel and in which said pile of beams is immersed gives rise however to the risk of so-called steam explosions due to the violent conversion of heat energy into mechanical energy. In order to avoid this risk, one embodiment of the aforesaid patent proposes to mount a suitable temporary collection structure below the reactor pressure vessel but above the level of the cooling fluid in said cavity, so that the molten material falls into the underlying fluid over an extended time.

The object of the present invention is to provide a solution to the problem of protecting the integrity of the reactor container base in nuclear power plants in which the potential risk of steam explosions is prevented more effectively, reliably and economically than in the aforesaid previous solution of the applicant.

SUMMARY OF THE INVENTION

This object is attained according to the invention by the method as defined in claim 1 and the device as defined in claim 5. Without changing the principle of uniform three-dimensional redistribution of the molten material into thin layers on which the preceding patent is based, the solution proposed by the present invention utilizes primarily the large heat capacity of the pile of beams, which in their particular arrangement are at least mostly dry, to initially cool and resolidify the molten material, whereas only later, but before the mass heats up too much by the effect of the decay heat, is the cavity containing the pile of beams totally flooded with cooling fluid, the purpose of which is therefore to finally cool the material which has deposited on the pile beams and to cool the pile itself. The gradual flooding of already resolidified material obviously does not give rise to any risk of steam explosion. This result is achieved without using a supplementary structure between the reactor pressure vessel and the pile of beams.

The beams of the pile are preferably of solid cross-section, preferably square or rectangular, with at least their upper side preferably provided with a continuous longitudinal cavity or channel for collecting the molten material. Each beam does not necessarily have to be in one piece, and can in practice be constructed in several adjacent pieces.

The material of the beams forming the pile can be of various types, but is preferably a material with high thermal conductivity and specific heat, high melting point and low chemical reactivity, to on the one hand allow rapid cooling of the molten material and the participation of the entire pile in the initial cooling of the material, and on the other hand to give a sufficient time margin for the total flooding of the cavity with the cooling fluid. Cost has also to be taken into account in choosing the materials. For example tungsten beams would be ideal, but their cost would be exorbitant.

Many materials can be considered such as graphite, cast iron, carbon steel, aluminium and aluminium alloys, copper etc. Graphite in particular is an excellent material as it totally satisfies all requirements (if necessary the graphite can be boronized to prevent the pile of beams with the molten core distributed and solidified on it becoming critical). In this respect, graphite has high thermal conductivity, good specific heat and a high sublimation temperature, in addition to a very low rate of oxidation in air or water up to 800°–1000° C. A graphite beam pile therefore behaves as a pile of graphite crucibles on which thin "ingots" of molten material deposit and solidify. Using a pile of graphite beams, the time required for solidifying the thin layers of molten material is only a few minutes. In addition, after the molten material has fallen onto this pile, the time by which total flooding with the cooling fluid has to take place is in no way critical, and flooding can take place gradually and without particular urgency (1–2 hours).

The time margin available before having to begin total flooding of the cavity with the cooling fluid while still preventing any risk of steam explosion can be increased by maintaining the lower portion of the cavity containing the pile of beams partially preflooded so as to use only the top part of the pile of beams, initially not immersed in the cooling fluid; for intercepting and collecting the molten material, so preventing its fall onto the cooling fluid in the lower part. The high temperature which the graphite beams and their holding cavity attain after the molten material has fallen causes in this case gradual evaporation of the fluid in the preflooded lower portion of the cavity, and the rising steam passing through the upper layers of beams in the pile provides an important contribution to their cooling, before it becomes necessary to finally and totally flood the cavity. As an alternative to the partial flooding of the pile of beams used for distributing and collecting the molten material, the pile of beams can be supported on a different support, consisting for example of stainless steel beams resting directly on the cavity base and submerged by the cooling fluid.

The cooling fluid can be water, and if necessary boronized water (as is well known, boron is a neutron absorber or "poison", and as such prevents if necessary the core distributed over the pile of beams becoming "critical"). As already stated, the actual material of the beams (such as graphite) can if necessary contain a certain boron concentration, or a neutron absorption element can be inserted into the beam body. The cooling fluid is made to flow into the cavity containing the pile of beams, preferably via its base, from a tank within the container.

The tank characteristics vary according to the type of containing system used for the reactor of the nuclear power plant. For example:

1) If the container is of the AP-600 design developed by Westinghouse and shown in FIG. 8 of the accompanying drawings, in which heat dispersal to the outside environment through the metal container wall takes place by natural convection, a small-capacity internal tank can be sufficient in that the steam produced in the reactor cavity can flow back into the cavity and repeat the cycle after condensation on the container walls.

2) If the container is of the large dry type shown in FIG. 2 of the accompanying drawings, a large-dimension water tank has to be provided to prevent the water boiling until a certain time has elapsed, with consequent pressurization of the container. To prevent or limit said pressurization either a system for cooling the container atmosphere or a system for cooling the water submerging the pile would have to be operated. However because of the fact that in the case of a serious accident the necessary electricity may not be immediately available for said systems, the plant has been provided with sufficient thermal inertia to achieve a time margin for operating the active systems.

As an alternative to the aforesaid cooling systems, the internal pressure of the container can be limited by opening vent valves automatically or manually. The vented gas must be filtered to prevent or limit the escape of radioactive products. As however the vent results in a loss of water, it cannot be operated indefinitely but only temporarily. In the long term the heat dissipation must always be achieved by operating a cooling system as heretofore described.

3) If the container is of the steam suppression type as shown in FIG. 1 of the accompanying drawings, the water of the suppression pool can be used for flooding the cavity housing the pile of beams and for recondensing the steam produced in the cavity by submerging the pile with the water. In this manner a natural transfer of the heat present or generated within the core material distributed over the pile of beams is achieved from the reactor cavity to the suppression pool. If the suppression pool is sufficiently large, the operation can proceed for a long time without having to operate the pool cooling system. This latter system has however to be operated sooner or later (for example after a few days).

By way of example, in the ensuing description reference will be made essentially to a steam suppression container, which offers various other advantages, without this however excluding the use of other types of container, in particular the types stated under points 1) and 2).

The cavity can be flooded for example by melting suitable fusible plugs or by opening suitable valves positioned in or on the pipes connecting the cavity to said tank.

BRIEF DESCRIPTION OF THE DRAWINGS

These and further characteristics of the invention and advantages deriving therefrom will be more apparent from the description of embodiments thereof given hereinafter with reference to the accompanying drawing, in which.

DESCRIPTION OF THE PREFERRED EMBODIMENTS

Figure 1:
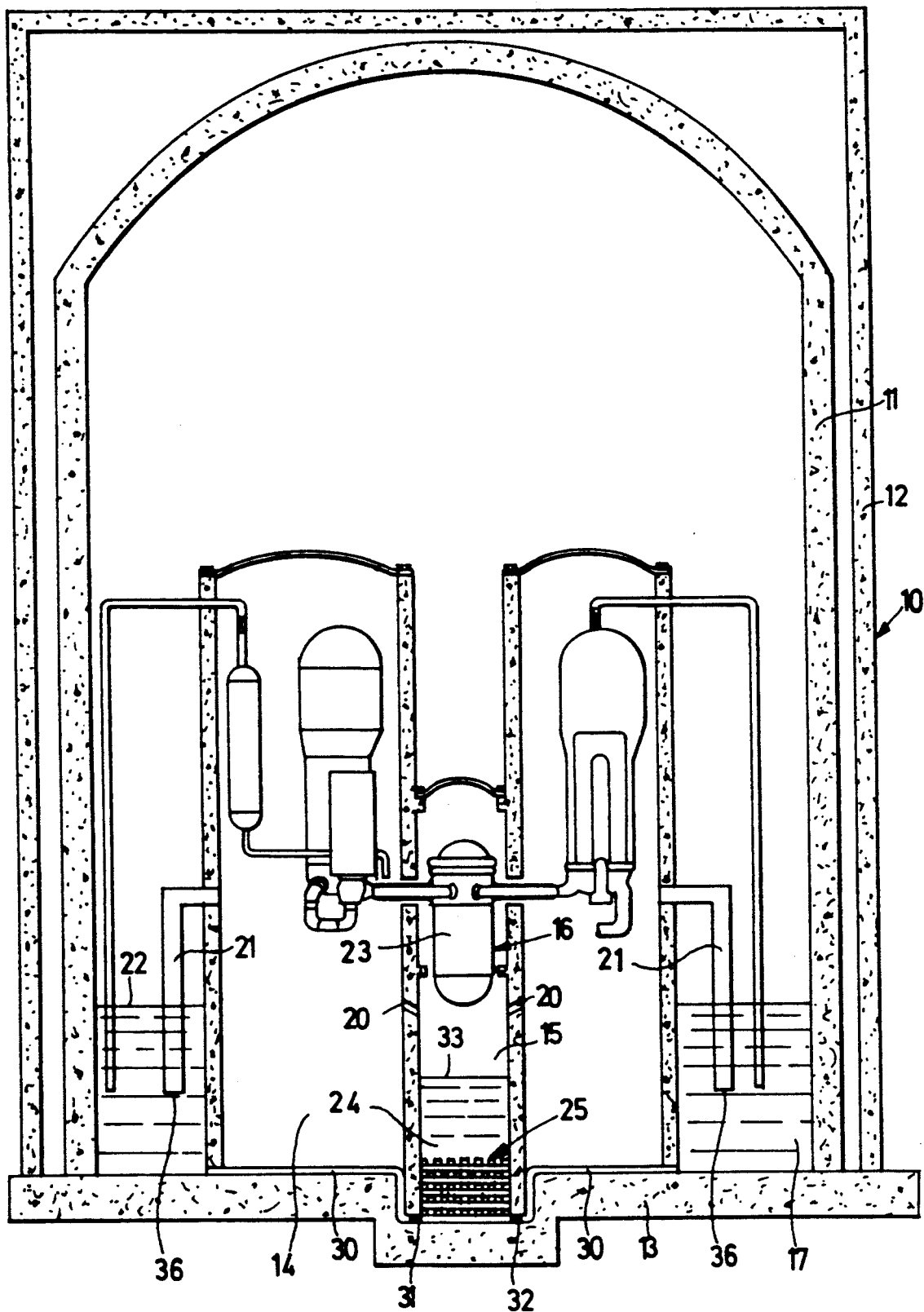
FIG. 1 is a schematic vertical section through the reactor containing building, of steam suppression type, in a nuclear power plant, showing the protection device of the invention after the reactor cavity has been flooded.
Figure 4:
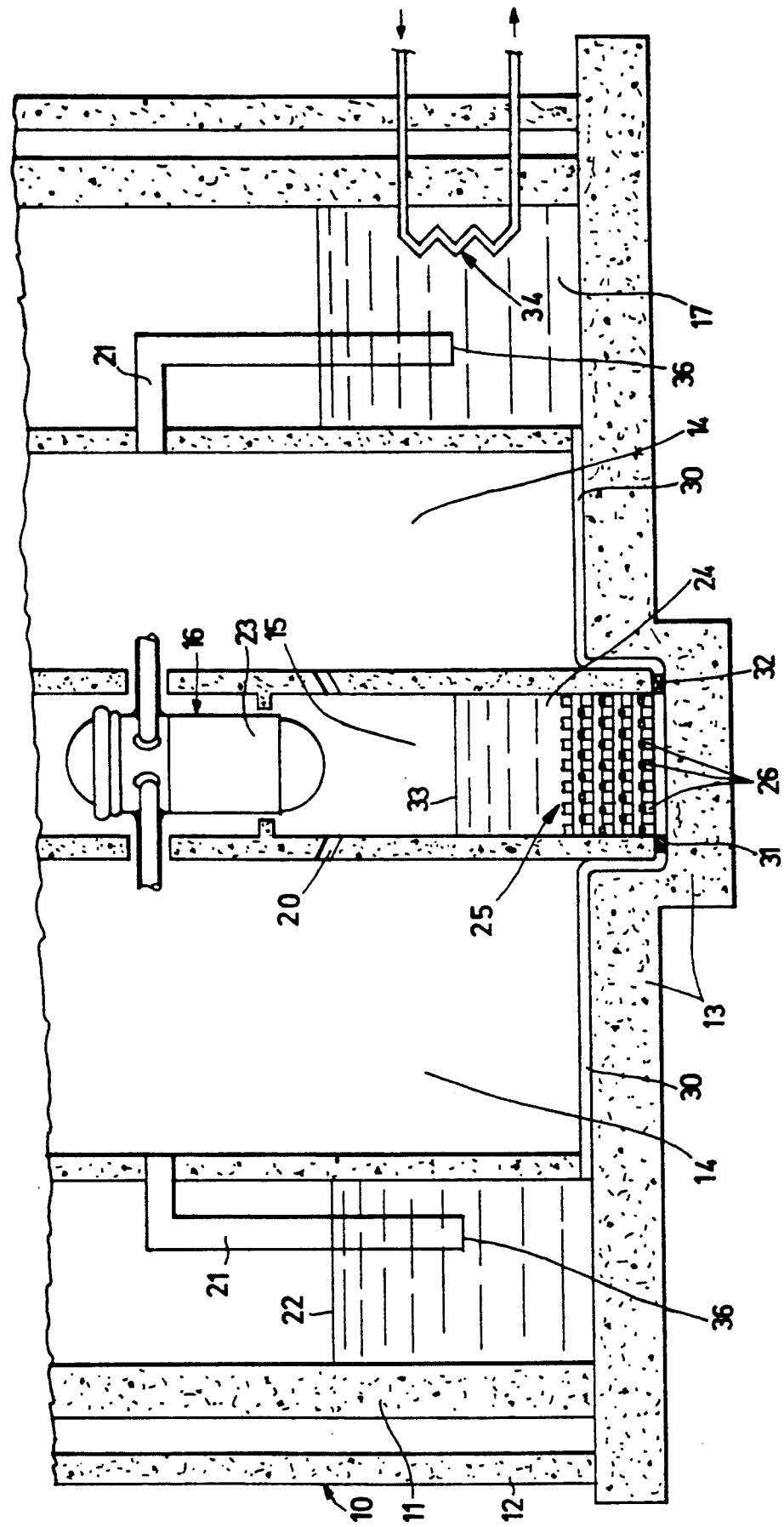
FIG. 4 is a vertical section through the lower part of the container of FIG. 1.

FIGS. 1 and 4 show the containing building 10, hereinafter called the container for brevity, of a nuclear power plant, comprising a primary container 11 surrounded by a secondary container 12, and a foundation slab 13, hereinafter called the base for brevity. Within the primary container 11 there is formed a central "dry well" 14 comprising at its centre the cavity 15 of the reactor, indicated by 16, and surrounded by a steam suppression pool 17.

Passages 20 in the wall surrounding the cavity 15 connect this cavity to the dry well 14, and discharge pipes 21 extending from said dry well 14 enable the steam produced in the cavity 15 to discharge into the fluid contained in the steam suppression pool 17.

The level of the cooling fluid in the pool 17 is indicated by 22, whereas the level reached in the cavity 15 after flooding is indicated by 33. The reactor 16 consists substantially of a pressure vessel 23 containing the reactor core. The vessel 23 is positioned in the upper part of the cavity 15, its lower part or base 24 containing the device for protecting the integrity of the container base 13.

This device consists of a pile 25 of beams 26 arranged in overlying layers, preferably with the beams of one layer parallel to each other and rotated about, and in particular perpendicular to, those of the next upper and lower layers of the pile.

Figure 5:
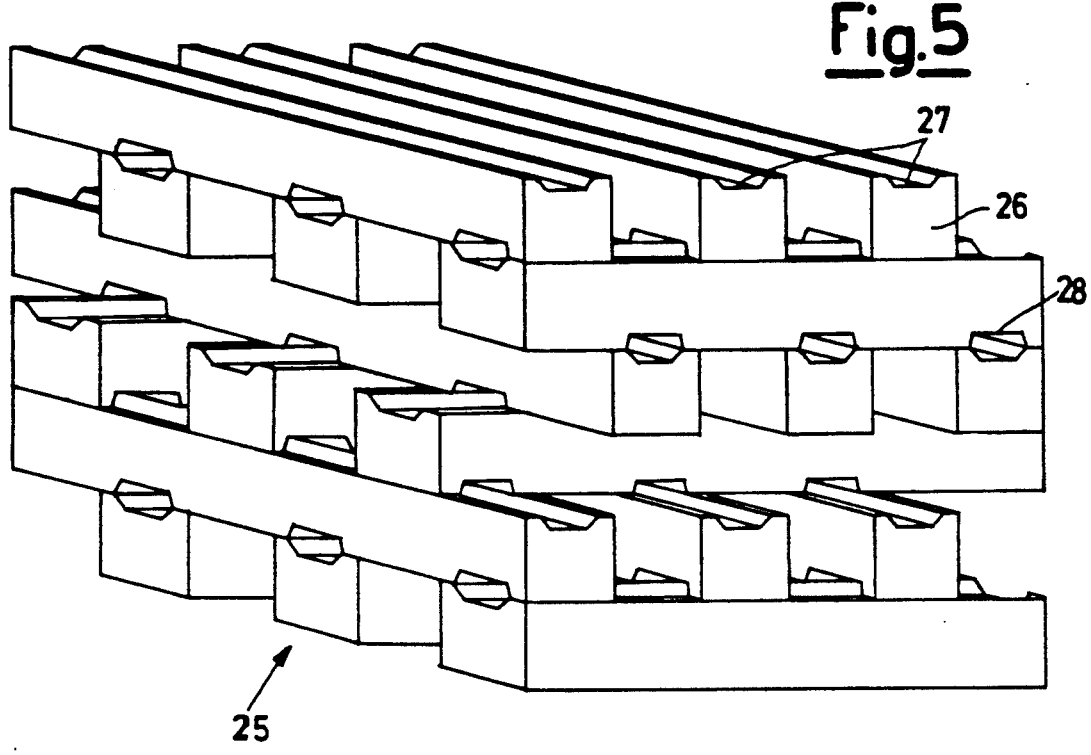
FIG. 5 is a perspective view of the pile of beams.
Figure 6:
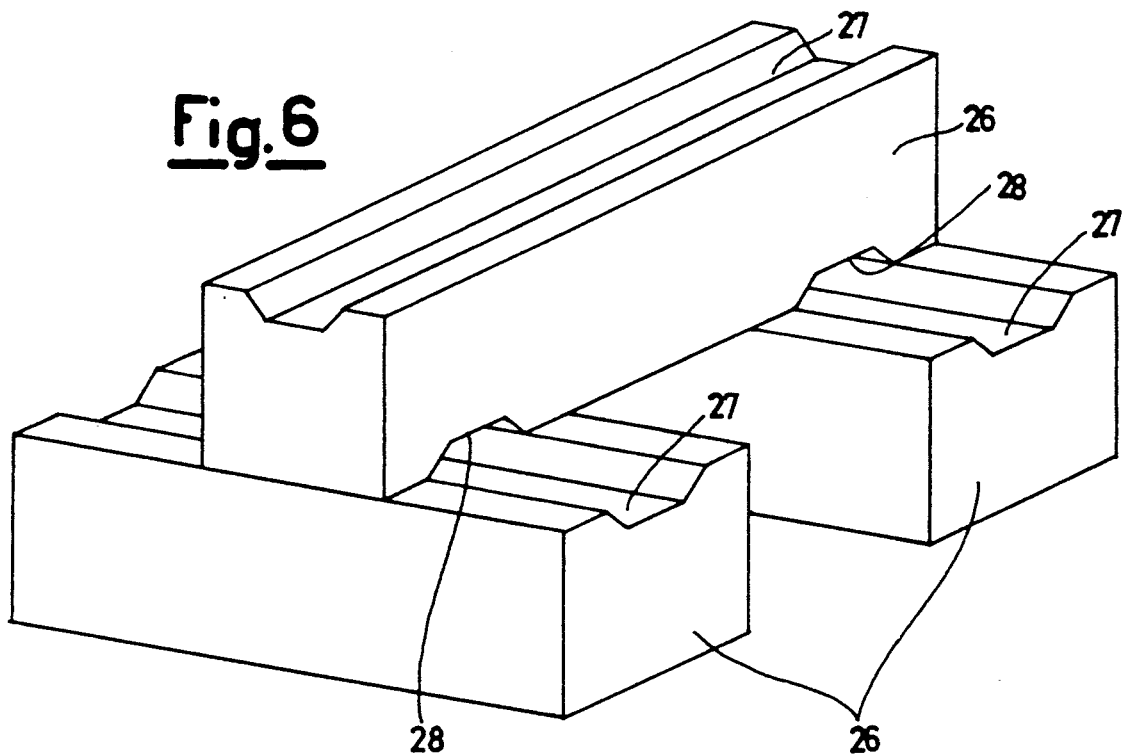
FIGS. 6 and 7 show perspective views of details of FIG. 5.

With reference in particular to FIGS. 5 and 6 which show a pile 25 of beams 26 and a relative detail thereof, it can be seen that each beam 26 is of substantially square solid cross-section. Other cross-sections, such as rectangular, are however possible. The upper side of each beam 26 comprises a longitudinal cavity or channel 27 extending along the entire length of the beam and in the illustrated example having a trapezoidal cross-section, which can however be of other shapes. The lower side of the beam 26 is provided, where it rests on the underlying beams, with grooves 28 to allow the molten material to flow freely along the channels 27, and prevent any blockage or obstruction which could occur if the lower face of the beam 26 were flat.

Hence in the piled arrangement 25 of the beams 26 the transverse grooves 28 an the lower side of the beams pertaining to one layer are superposed on the longitudinal channels 27 in the upper side of the beams pertaining to the lower layer. In addition, the parallel beams pertaining to a determined layer are offset relative to the beams parallel to it of the next or previous layer in which the beams have the same arrangement (see FIGS. 3 and 5), in order to intercept the molten material overflowing from the beams of the upper layer.

The number, shape and dimensions of the beams 26 and of the channels 27 are chosen such that the molten material does not reach the cooling fluid base 13.

A pile 25 of beams 26 as heretofore described compels the molten material, which in the case of meltdown of the core of the reactor 16 and perforation of its pressure vessel 23 escapes and falls from it, to take very tortuous paths so that it becomes redistributed and expanded over the beams, to mainly collect in the channels 27 in the upper side of the beams 26 to form thin layers, and also partly adheres to the upper edges and side faces of the beams.

Figure 7:
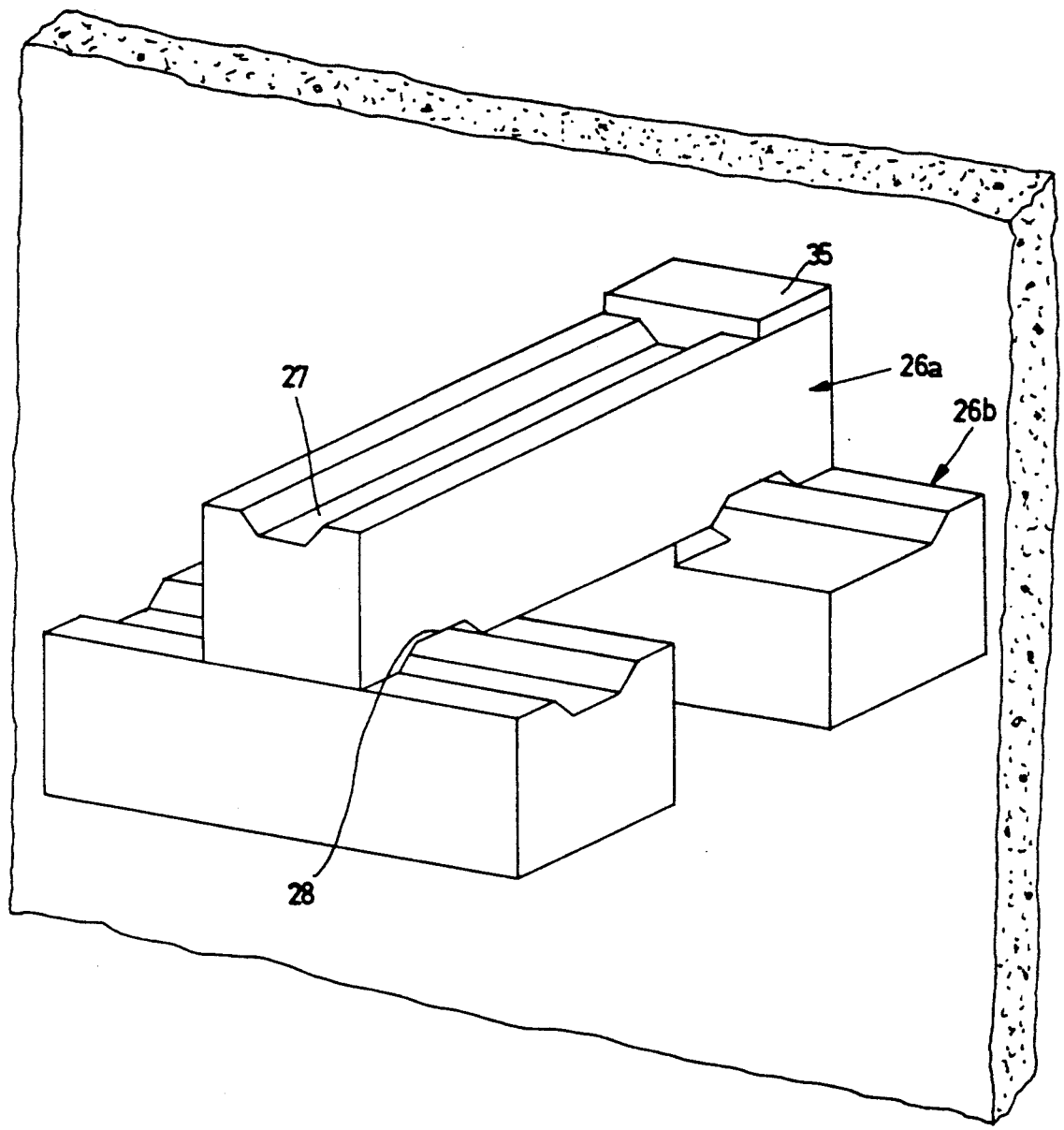

As shown in FIG. 7, those ends of the beams 26 in contact with the vertical walls of the cavity 15 are shaped to prevent contact between the molten material and the vertical walls. Specifically, those beams 26a perpendicular to said walls are provided at their ends with a block 35 which closes the channel 27. In contrast, in the beams 26b adjacent to said walls, that edge of the channel 27 opposite that in contact with the relative wall is removed, except where the upper beams rest, in order that the molten material overflows only inwards.

The beams 26 are constructed preferably of a material with high thermal conductivity, high specific heat and a high melting point, in addition to good chemical stability. Graphite is particularly suitable for this purpose, even though other materials can be considered, such as cast iron, carbon steel, aluminium or its alloys, and others.

Concrete, which would be very convenient in terms of cost, has a low thermal conductivity, and gradually degrades at the temperature determined by its contact with the molten material. Because of its heat capacity, it is difficult for a concrete mass to participate in the cooling of the molten material. However, as the reaction leading to the erosion of the concrete is endothermic and the layers of molten material are thin, the use of concrete, possibly of special type, cannot be excluded, provided that the flooding of the cavity occurs before the erosion of the concrete is too advanced.

It should be noted that the pile 25 of beams 26 is initially dry in the lower part 24 of the cavity 15, and rapid cooling with consequent resolidification of the molten material, distributed regularly and three-dimensionally, takes place by utilizing the large heat capacity of the pile of beams and the good thermal conductivity of the beam material. The result is that all the beams forming the pile participate in the initial cooling process. As this resolidification takes place in a dry environment, any risk of steam explosion is excluded and the molten material is prevented from coming into direct contact with the container base 13, which is therefore protected against erosion and degradation. Before the mass of piled beams heats up too much by the effect of the heat of decay, the lower part 24 of the cavity 15 containing the pile 25 of beams is flooded, according to the invention, with a cooling fluid, in particular boronized water.

Figure 3:
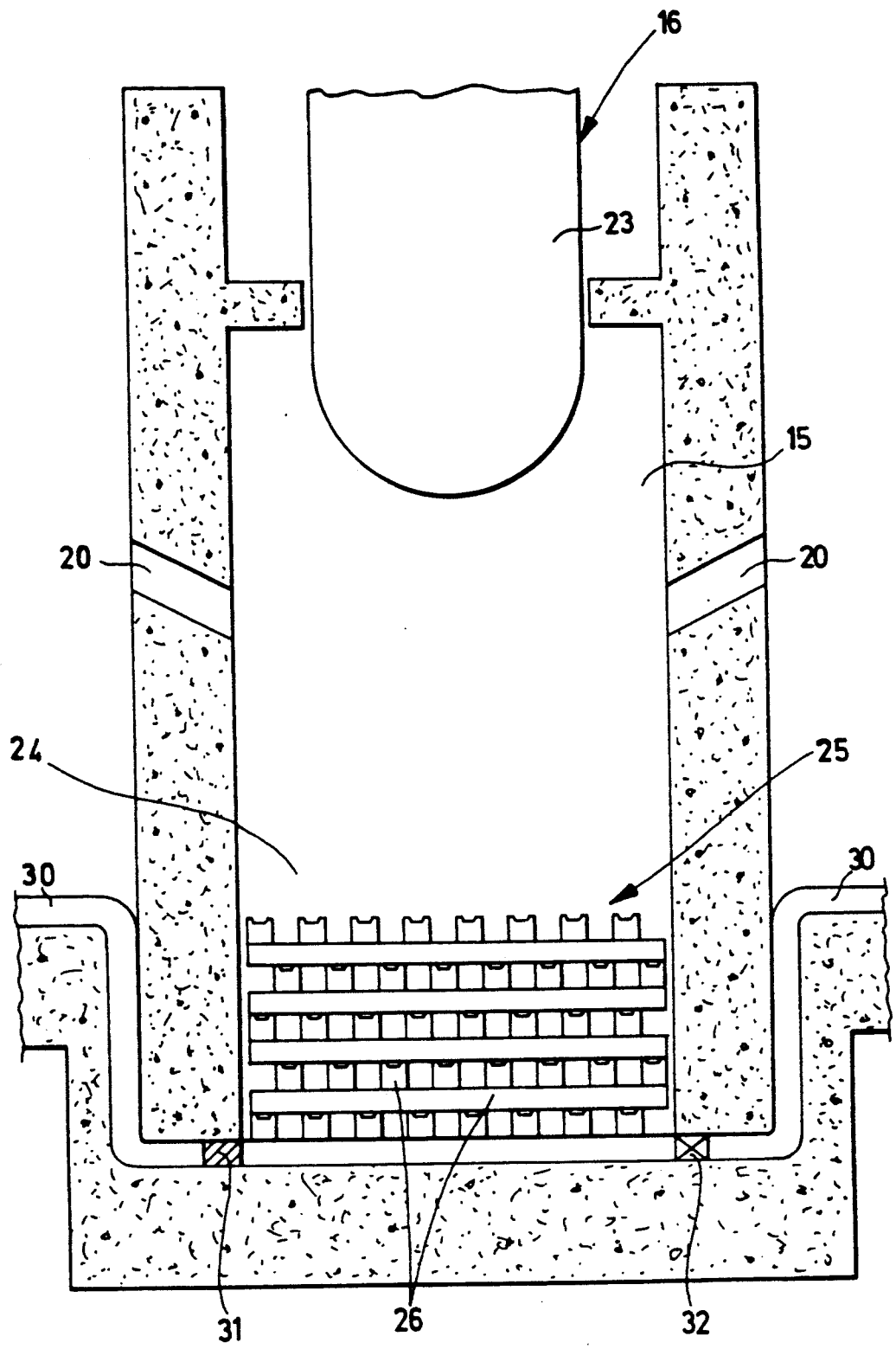
FIG. 3 is a vertical section through the reactor cavity in a nuclear power plant, showing the base protection device of the invention before flooding the cavity.

In the case of the embodiment shown in FIGS. 1, 3 and 4, this cooling water can be fed into said lower part 24 of the cavity 15 directly from the steam suppression pool 17 via numerous connection pipes 30. The pipes 30 connect the bottom of the pool 17 to the bottom of the lower part 24 of the cavity 15, and can comprise suitable plugs 31 fusible at high temperature or valves 32 operated automatically or remotely. For safety reasons, some of the pipes 30 should be provided with valves 32 and other pipes 30 be provided with fusible plugs 31. The flooding of the lower part 24 of the cavity 15 with cooling water therefore begins from the bottom and at the desired moment, i.e. after the molten material has already resolidified on the beams 26 and before excessive overheating is created by the effect of the heat of decay. It is apparent that this flooding of the already resolidified and cooled material does not give rise to any risk of a steam explosion and serves only to finally cool the material already deposited on the beams of the pile.

Because of the high melting point and specific heat of the material forming the piled beams, in particular graphite, there is a sufficient time margin for the flooding as heretofore stated. The level 33 reached by the water above the pile 25 is less than the level 22 in the suppression pool 17 because of a slight gauge pressure in the dry well 14. At equilibrium, the level 33 is about the same as the level of the vent openings 36 of the pipes 21.

If there is space available within the dry well 14, a supplementary tank (not shown) of cooling fluid can be provided in it, in communication both with the cavity 15 and with the suppression pool 17.

Figure 2:
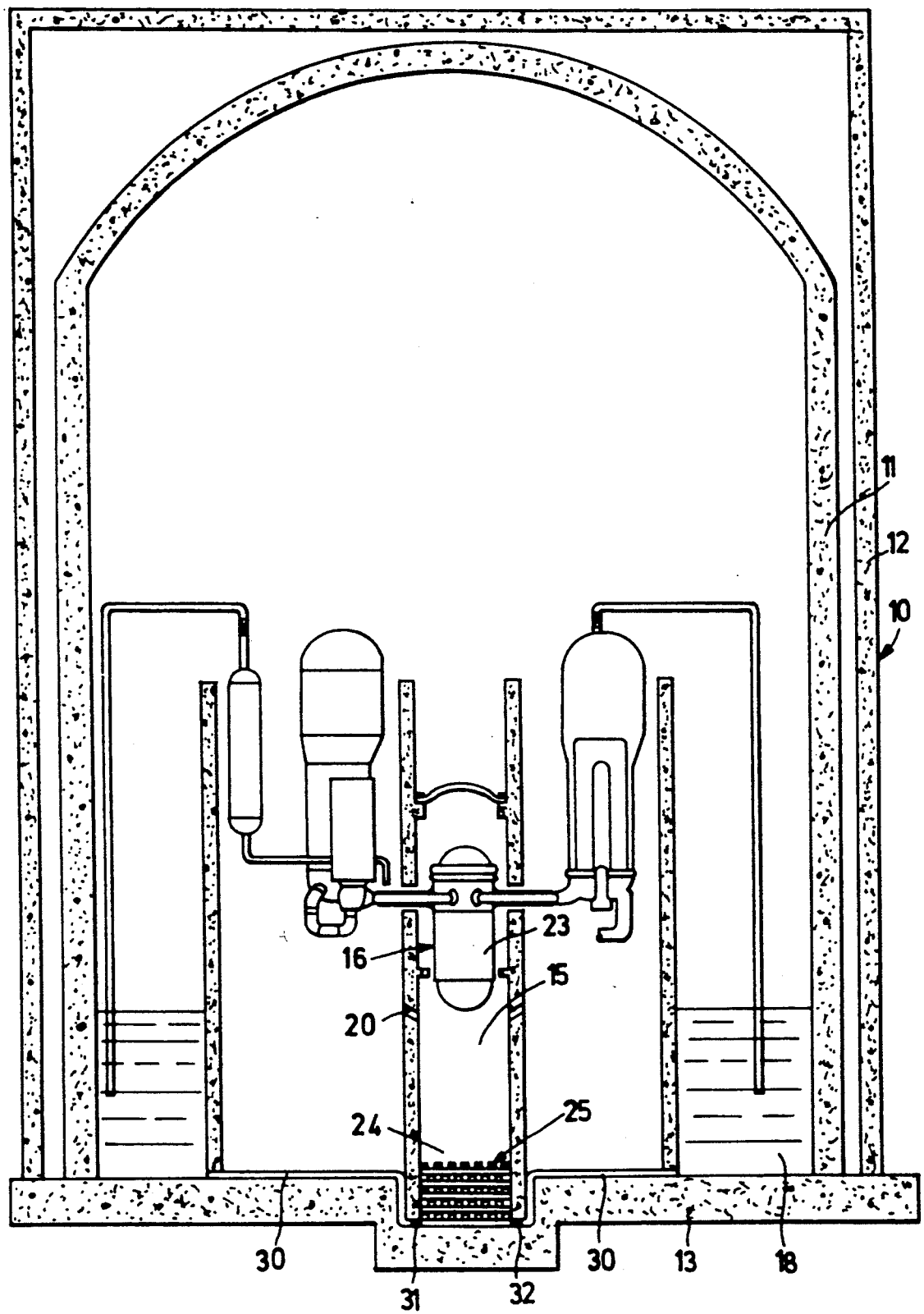
FIG. 2 is a schematic vertical section through the reactor containing building, of large dry type, in a nuclear power plant, showing the base protection device of the invention before flooding the reactor cavity.

In the embodiment shown in FIG. 2, in which parts corresponding to those already described are indicated by the same reference numerals, the cooling fluid is made to reach the lower part 24 of the cavity 15 via its base, from a tank 18 which however in this embodiment does not act as a suppression pool.

To increase the time margin within which the flooding of the lower part 24 of the cavity 15 has to be commenced, i.e. before the mass of beams 26 overheats excessively, the method of the invention comprises a modification consisting of partly preflooding the lower part 24 of the cavity 15 with cooling fluid. In this manner, only the upper part of the pile 25 of beams 26 remains initially dry, this part being used to intercept and collect the molten material falling from the pressure vessel 23 of the reactor 16, to prevent it falling on the cooling fluid used for the partial preflooding. The redistribution of the molten material and its resolidification again take place in a dry environment in this case, whereas after the fall of the molten material the high temperature reached by the graphite beams and the cavity in which they are located causes gradual evaporation of the fluid in the underlying preflooded region. The steam generated in this manner rises upwards and passes through the upper layers of pile beams, to contribute to the cooling of the beams and retarding their overheating, so extending the time within which the final total flooding of the lower part 24 of the cavity 15 has to be carried out.

The dry pile portion can have the same height as the already described pile without the partial preflooding, with consequent increase in the total pile height. Alternatively, the total pile height can be unchanged, with automatic reduction of the height of its dry portion. In this latter case the channels 27 must be slightly deeper in the beams 26 to again allow total collection of the molten material on the dry beams. It should be noted that it is also possible to support the dry part of the beam pile on stainless steel beams immersed in water.

As is apparent from the aforegoing description of the method and device of the invention, not only is the reactor-containing building in nuclear power plants and in particular its foundation slab properly protected in the case of serious accidents involving reactor core melt-down, perforation of its pressure vessel and consequent fall of molten material, but in addition the proposed arrangement also obviates the risk of steam explosions in an effective, reliable and simple manner. This is achieved in that uniform three-dimensional redistribution of the molten material, its resolidification and its initial cooling are effected in a dry environment, and that flooding with cooling fluid to achieve final cooling is carried out only after resolidification of the molten material.

The large volume of the suppression pool 17 enables a serious accident comprising core melt-down and its escape from the pressure vessel to be confronted without using "active" systems (i.e. requiring electrical power, which in certain cases may not be always available), and instead using only "passive" systems. However, to consider the plant to be totally safe after the accident, it is necessary to activate at a certain point the cooling system 34 of the pool 17 (illustrated schematically in FIG. 4), which transfers the heat of decay to the outside and maintains the temperature of the resolidified material deposited in the beams low.

The longer the delay which can be tolerated before operating the active cooling systems, the better. The proposed system offers a very long delay time.

Figure 8:
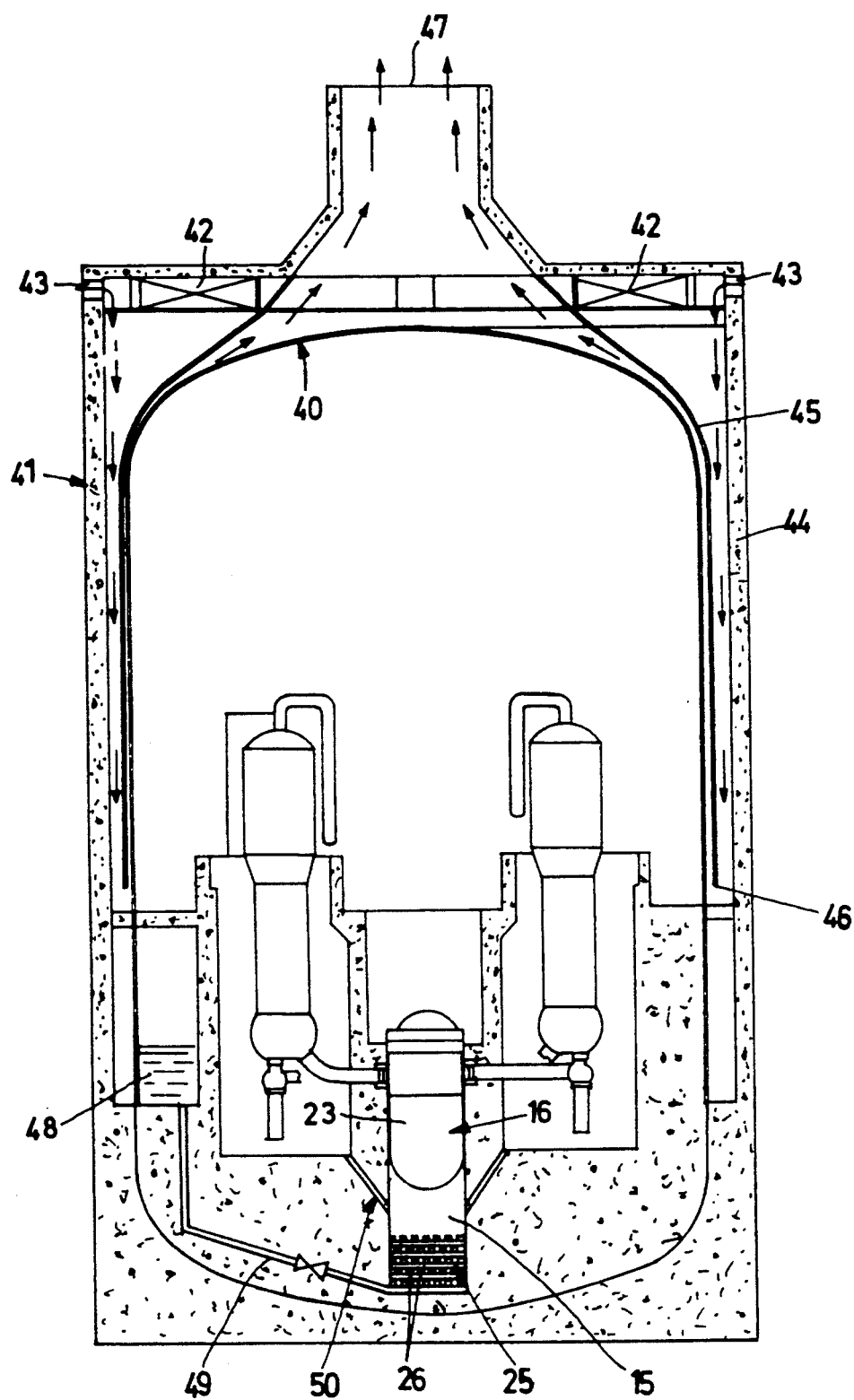
FIG. 8 is a schematic vertical section through the container of AP-600 design, showing the base protection device of the invention before flooding the reactor cavity.

FIG. 8 shows a possible application of the invention to the container of the aforesaid AP-600 design. In this design the primary container 40 is of metal and is enclosed in a building 41. The primary container 40 enables the internally generated heat to be dissipated to the external environment passively. Initially, water contained in upper tanks 42 is sprayed onto the container 40. Later, the heat dissipation is achieved by air, which enters through apertures 43 in the building 41 and descends between the walls 44 of the building and a baffle 45 inserted between the container 40 and said walls. After passing about the lower edge 46 of the baffle 45, the air grazes the outside of the container 40 to remove the heat, and leaves through a stack 47 (see arrows in FIG. 8).

The cavity 15 containing the reactor 16 again houses a pile 25 of beams 26, as in the already described embodiments.

The cavity 15 is flooded by connecting a tank 48, located within the container 40, to the bottom of the cavity 15 via connection pipes 49 provided with shut-off members.

The water volume in the tank 48 can be much less than in the tanks 17 or 18 of the previously described embodiments, in that the steam produced in the cavity 15 can flow back into the cavity 15 through apertures 50 after it has condensed on the inner walls of the container 40.

Some embodiments of the invention have been described, however modifications can be made thereto without leaving the scope of the invention, in particular with regard to the shape and dimensions of the beams forming the pile of interception elements, their material, the number of layers of beams and the number of beams in each layer.

The level 33 to which the cavity 15 has been flooded can be suitably measured, for example by appropriate level measuring instruments.

The shut-off members for feeding the cooling fluid can be opened automatically, and can also be of "passive" type, i.e. not requiring external energy for their operation.

I claim:

1. A method for protecting the integrity of the reactor container base in nuclear power plants in the case of an accident involving melt-down of the reactor core and the consequent escape from the pressure vessel of molten material which falls into the container cavity positioned below the reactor pressure vessel, said method comprising:

intercepting the molten material falling from the reactor on interceptor elements and redistributing said molten material regularly and three-dimensionally in layers of small thickness on the surface of said interceptor elements to prevent the molten material from coming into contact with the container base, and to cool and resolidify said molten material in a dry environment in the container cavity below the reactor, said interceptor elements being constructed of a material which provides rapid initial cooling and resolidification of the molten material by virtue of the having a high heat capacity and thermal conductivity said container cavity containing said interceptor elements being flooded with a cooling fluid only after the molten material has resolidified bit before the mass of said interceptor elements has overheated, in order to achieve final cooling of the solidified material distributed on the surface of said interceptor elements.

2. A method as claimed in claim 1, characterised in that the interceptor elements used are graphite beams of solid-cross section, which contain a neutron poison to prevent the formation of a critical mass.

3. A method as claimed in claim 1, characterised in that the cavity is flooded gradually starting from its bottom.

4. A method as claimed in claim 1, characterised by partially preflooding the lower part of the cavity, its subsequent total flooding being effected after the molten material has resolidified on the surface of the interceptor elements.

5. A method as claimed in claim 1, characterised in that said interceptor elements consist of beams of solid square or rectangular cross-section, in the form of several adjacent pieces, and comprising in their upper side a continuous longitudinal channel for collecting molten material.

6. A device for protecting the integrity of the reactor container base in nuclear power plants, in which the reactor has a pressure vessel which is positioned at least with its lower part in a cavity of said container, said cavity, which is below the reactor pressure vessel, having interceptor elements in superposed layers to form a pile for intercepting and regularly and three dimensionally redistributing in small-thickness layers over a large heat transfer area the molten material which escapes and falls from the reactor pressure vessel in the case of an accidental melt-down of its core, to prevent the molten material from being able to come into direct contact with the container base, characterised in that said interceptor elements are arranged in a dry environment and are constructed of a material having a high thermal conductivity, good specific heat and a high melting point, said cavity being in communication with a tank of cooling fluid via connection pipes that are provided with shut-off means.

7. A device as claimed in claim 6, characterised in that said interceptor elements consist of beams of solid square or rectangular cross-section, in the form of several adjacent pieces, and comprising in their upper side a continuous longitudinal channel for collecting molten material.

8. A device as claimed in claim 7, characterised in that said beams comprise transverse grooves in their lower side in correspondence with the channels of the underlying beams, to prevent obstructing the free flow of molten material along the channels.

9. A device as claimed in claim 6, characterised in that said beams are constructed of graphite.

10. A device as claimed in claim 6, characterised in that the cooling fluid tank is located within the container.

11. A device as claimed in claim 10, characterised in that in containing systems of steam suppression type, said tank is the actual steam suppression pool.

12. A device as claimed in claim 6, characterised in that said beams are constructed of graphite which contains a neutron poison.

13. A method for protecting the integrity of the reactor container base in nuclear power plants in the case of an accident involving melt-down of the reactor core and the consequent escape from the pressure vessel of molten material which falls into the container cavity positioned below the reactor pressure vessel, said method comprising: intercepting the molten material falling from the reactor on interceptor elements and redistributing said molten material regularly and three-dimensionally in layers of small thickness on the surface of said interceptor elements to prevent the molten material from coming into contact with the container base, and to cool and resolidify said molten material in a dry environment in the container cavity below the reactor, said interceptor elements being constructed of a material which provides rapid initial cooling and resolidification of the molten material by virtue of the having a high heat capacity and thermal conductivity, and flooding said container cavity containing said interceptor elements with a cooling fluid only after the molten material has resolidified in order to achieve final cooling of the solidified material which is distributed on the surface of said interceptor elements.

* * * * *